Oct. 13, 1959　　　M. C. HOOVER ET AL　　　2,908,375
VERTICAL DESCENT MATING PAN LEMON FEEDER
Filed Oct. 8, 1954　　　　　　　　　　　　　6 Sheets-Sheet 3
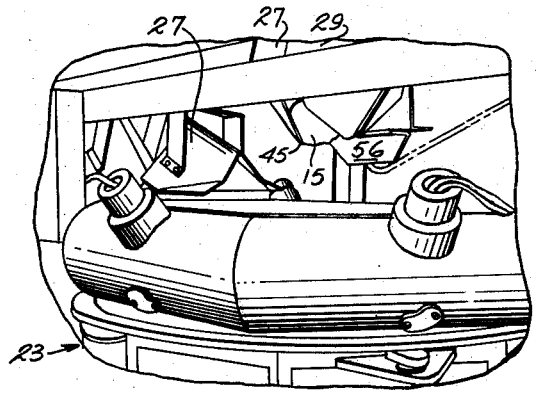
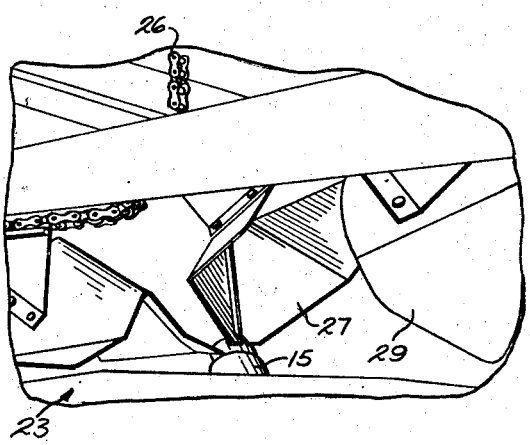
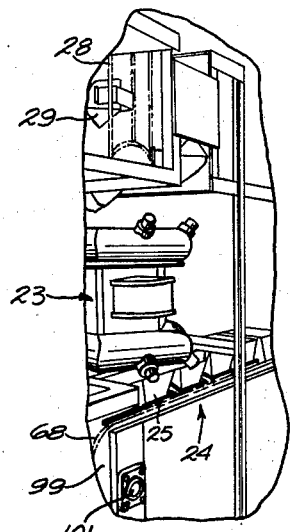
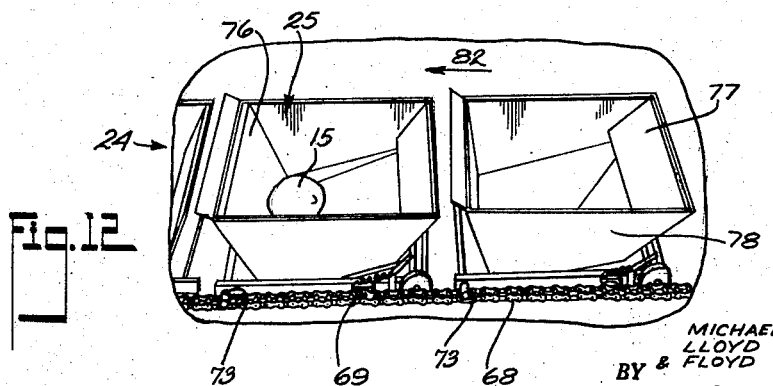
INVENTORS
MICHAEL C. HOOVER
LLOYD A. KAUFMAN
BY & FLOYD S. SMITH
*Frederic B. Schramm*
ATTORNEY

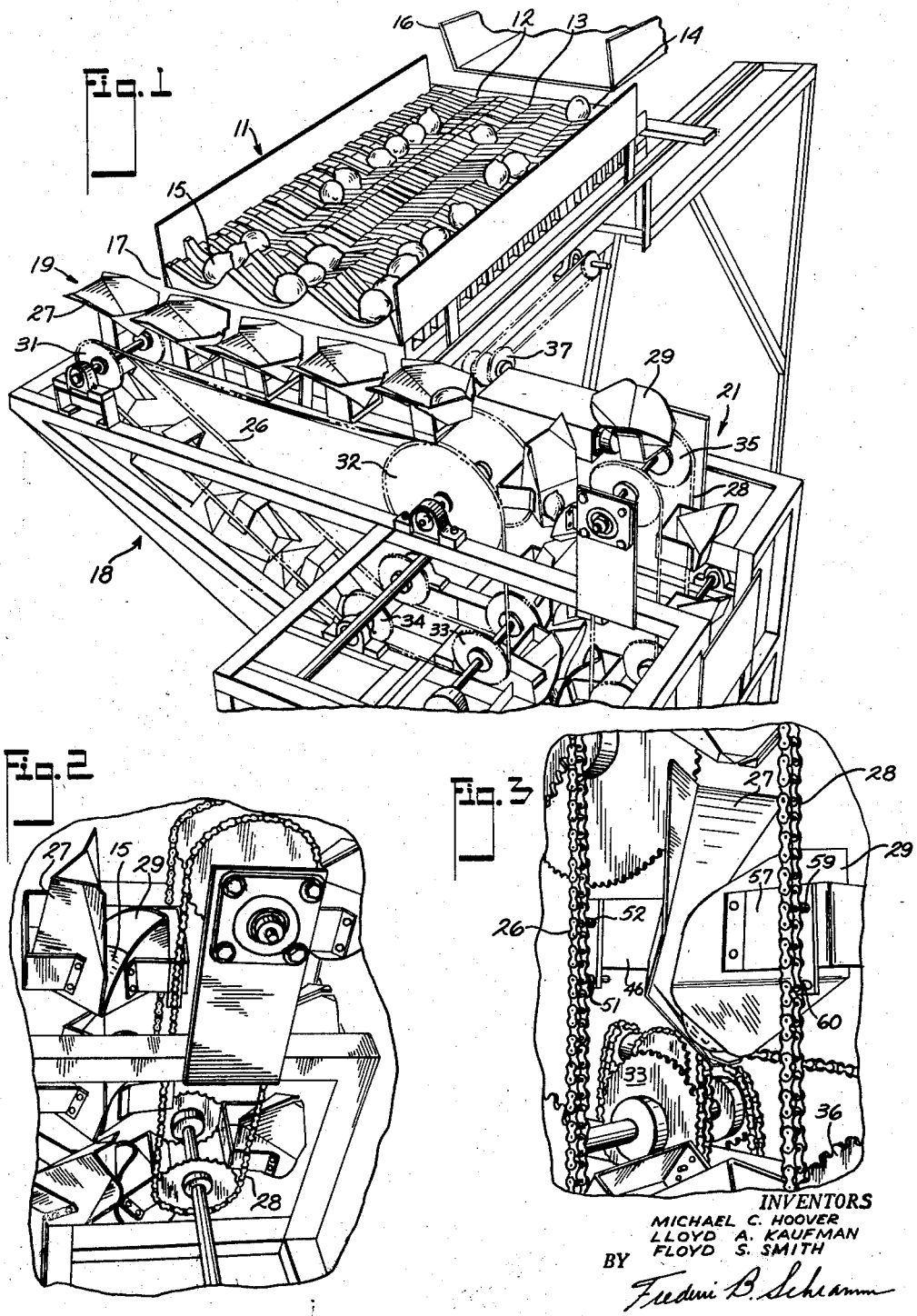

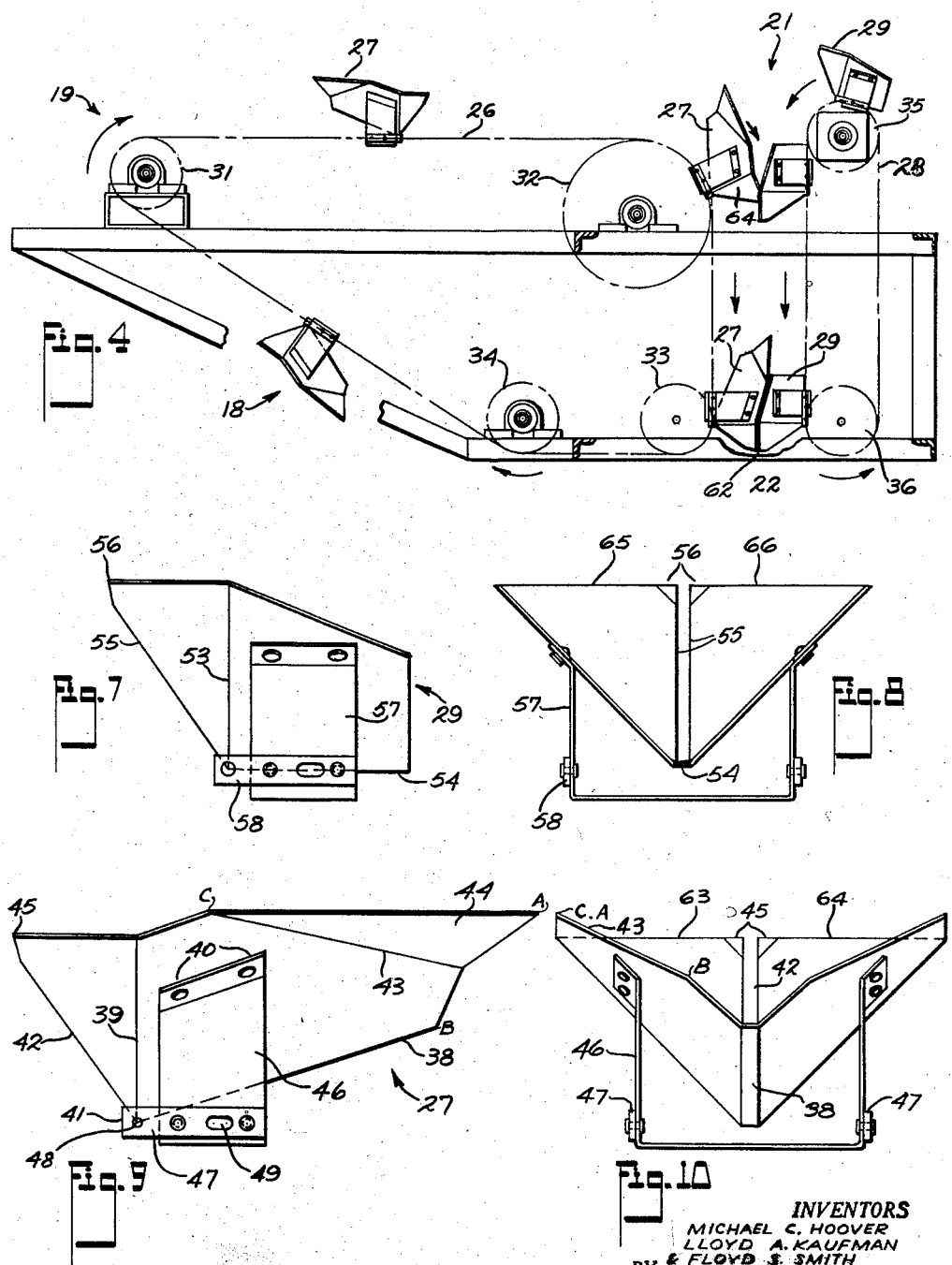

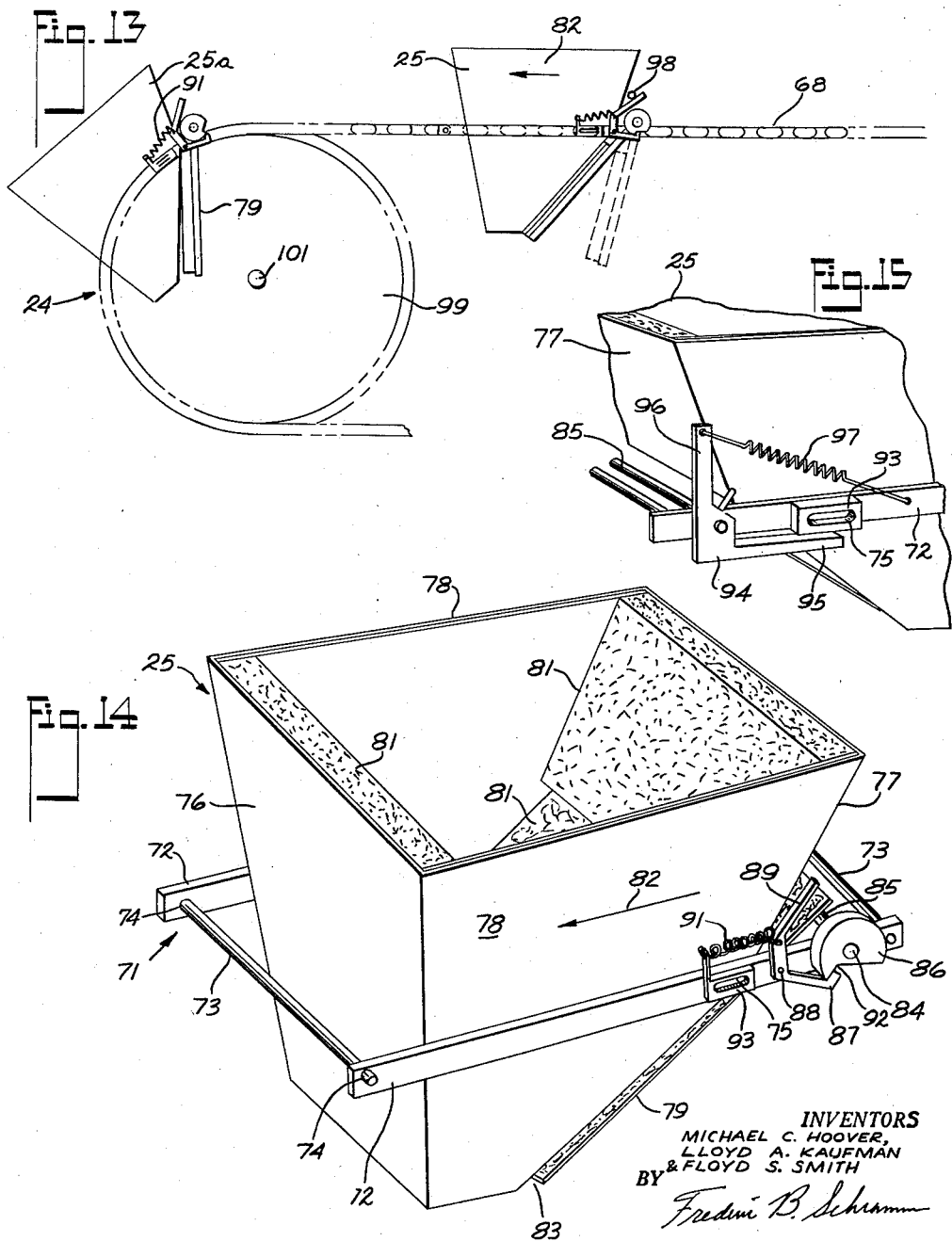

Oct. 13, 1959 M. C. HOOVER ET AL 2,908,375
VERTICAL DESCENT MATING PAN LEMON FEEDER
Filed Oct. 8, 1954 6 Sheets-Sheet 5
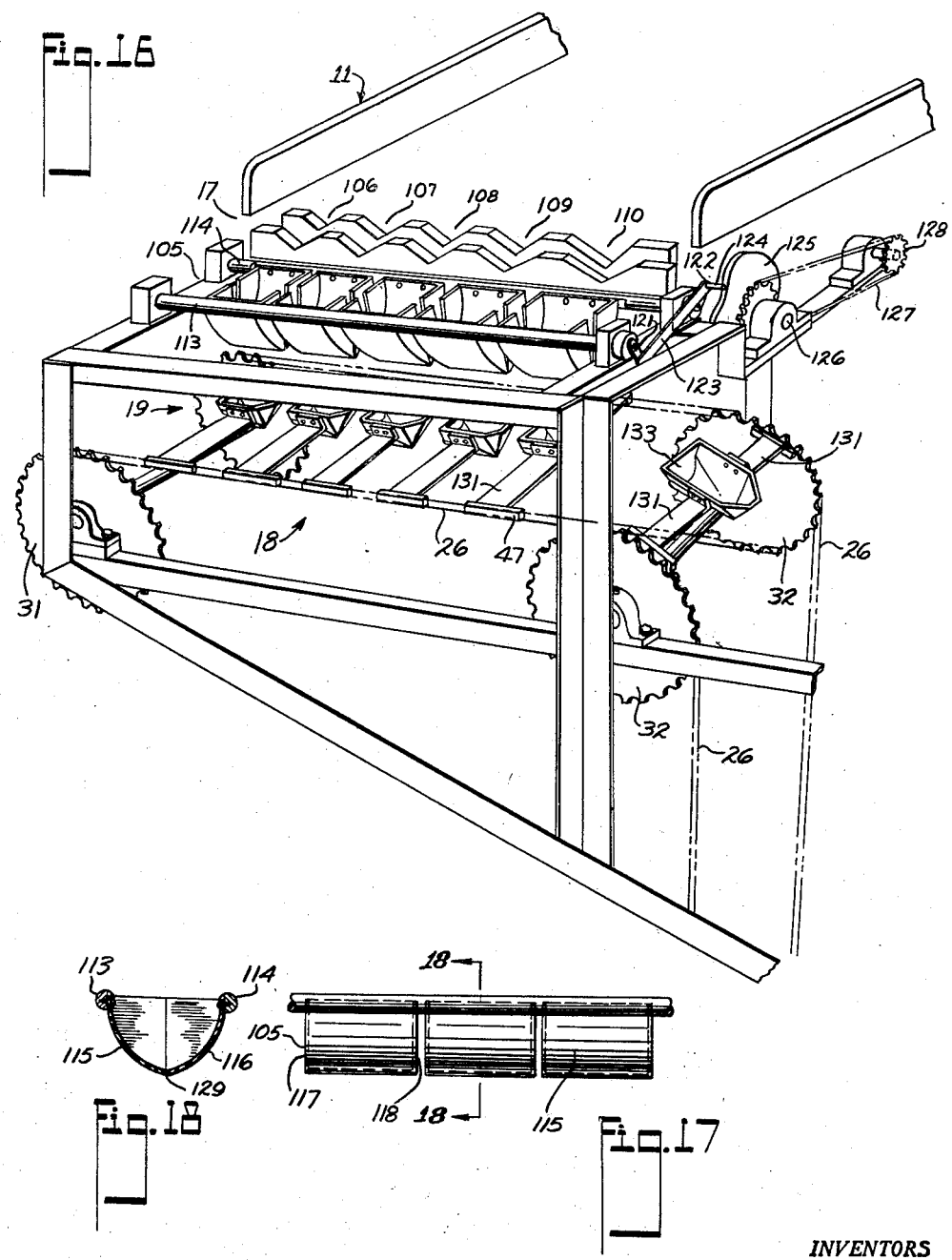
INVENTORS
MICHAEL C. HOOVER
LLOYD A. KAUFMAN
& FLOYD S. SMITH
BY
ATTORNEY

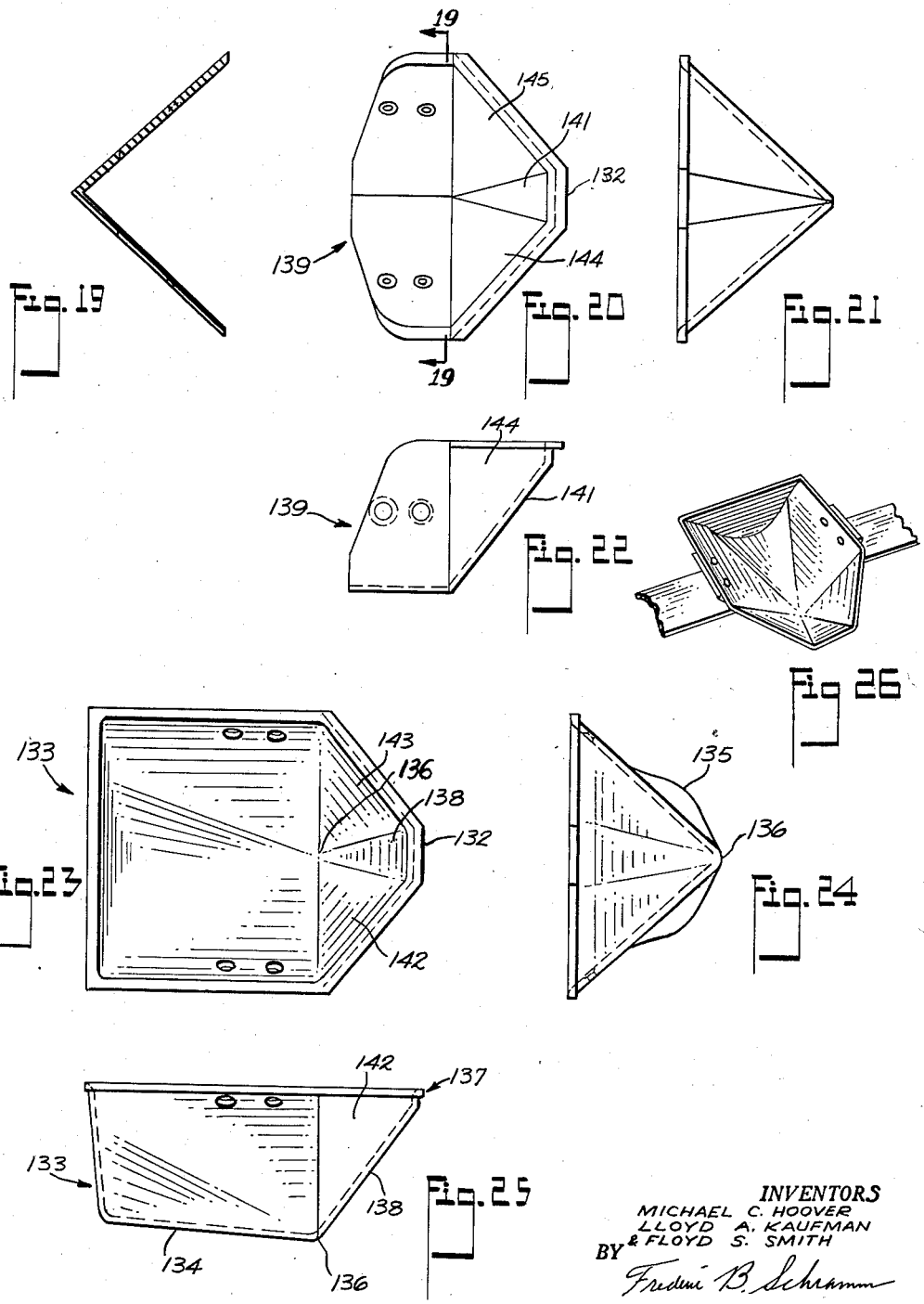

United States Patent Office 2,908,375
Patented Oct. 13, 1959

2,908,375

VERTICAL DESCENT MATING PAN LEMON FEEDER

Michael C. Hoover, Floyd S. Smith, and Lloyd A. Kaufman, Grand Rapids, Mich., assignors to Mandrel Industries, Inc., a corporation of Michigan Application October 8, 1954, Serial No. 461,072

14 Claims. (Cl. 198—33)

Our invention relates to sorting and conveying and concerns particularly the rapid, effective handling of articles to be sorted.

An object of our invention is to sort relatively fragile articles rapidly without bruising or other damage.

A further object of our invention is to permit such articles to be dropped through a pre-fall type of photoelectric sorting head and received without injury after inspection by the photo-electric sorter. Another object of the invention is to separate the articles into a plurality of lanes or to deposit them in a plurality of bins classified according to the differences in the articles indicated electrically or by photo-electric response.

An additional object of the invention is to provide an improved vertical conveyer. Still another object is to provide a conveyer having both horizontal and vertical portions for continuous movement of articles. An additional object is to provide a horizontal conveyor for receiving articles deposited thereon from a plurality of rows, accurately spaced and without injury to the articles.

Still another object of the invention is to provide a mating pan conveyer with cooperating elements for holding an article while carrying it down, but adapted to separate for releasing the article at the desired time.

A further object of the invention is to provide an improved trip pan structure for receiving articles without bruising when dropped thereon, for conveying the articles, and discharging them selectively in different positions in response to signals from the photo-electric sorting head. Another object of the invention is to provide an improved photo-electric sorting system for fragile articles or for articles most readily inspected while falling freely.

Other and further objects, features and advantages of the invention will become apparent as the description proceeds.

In carrying out the invention in accordance with a preferred form thereof in the sorting of fragile articles such as lemons, for example, a walking-board conveyor is provided, having a plurality of lanes with advancing parallel rows of lemons. A mating pan conveyor is provided with a top horizontal run in receiving relationship to the walking board conveyor and synchronized therewith to present a plurality of receiving pans to the walking-board conveyer whenever lemons are ejected therefrom. The mating pan conveyor has also a vertical run in which the articles are carried from the horizontal run of the mating pan conveyor downward along a vertical path to a point above a photo-electric sorting head, having an opening through which the lemons are permitted to fall from the vertical run of the mating pan conveyor.

In the mating pan conveyor, there are two sets of cooperating pans carried by two independent pairs of conveyor chains so that as the articles pass from the horizontal to the vertical run cooperating pans from the independent conveyor chains will come together for holding one lemon or other articles between each pair of cooperating mating pans. As the mating pans reach the lower end of the vertical run, the pans separate, first at the bottom, relinquishing the article which thereupon falls through the sorting head. In the head an optical inspection is performed while the article is falling freely so that it may be "observed" on all sides and need not be supported or handled while being inspected by the photoelectric apparatus.

Below the sorting head is a trip pan conveyor having resiliently mounted pans, moving horizontally, and synchronized with the photo-electric sorting mechanism and the preceding conveyors so as to receive each lemon without bruising in a separate trip pan as it falls from the photo-electric sorting head. Detainer pins or trip pins are provided for causing the bottom of a trip pan to open for discharging the lemon in one of several different positions according to the response of the photo-electric sorting mechanism at the preceding instant that the lemon in question was passed through the photo-electric sorting head. Below the trip pan conveyor are a plurality of transverse conveyors or if desired bins for receiving the lemons according to the classification determined by the response of the photo-electric sorting head.

A better understanding of the invention will be afforded by the following detailed description considered in conjunction with the accompanying drawings in which:

Fig. 1 is a perspective view of a conveying system for supplying fragile articles such as lemons, other fruits or the like to the sorting head of a free fall type of photoelectric sorting type apparatus.

Fig. 2 is a perspective view illustrating the vertical run of the mating pan portions of the conveyor in Fig. 1 in greater detail.

Fig. 3 is a perspective view with still greater enlargement than Fig. 2, showing particularly one pair of mating pans and supporting mechanism.

Fig. 4 is a schematic side elevation of the mating pan conveyor system illustrated in Fig. 1.

Fig. 5 is an enlarged fragmentary view, in perspective, of the lower end of the mating pan conveyor of Figs. 1 to 4, together with the upper portions of the photo-electric sorting head and showing the mating pans in the position beginning to open.

Fig. 6 is a further enlargement of a portion of the apparatus of Fig. 5 shown in perspective with the lowermost mating pans fully opened and the article released therefrom falling into the photo-electric sorting head.

Fig. 7 is a side elevation of a holding pan constituting one of the cooperating mating pans of the mating pan conveyor.

Fig. 8 is an end elevation of the holding pan of Fig. 7.

Fig. 9 is a side elevation of a receiving pan constituting one of a pair of cooperating mating pans of the mating pan conveyor, designed to be supported on conveyor chains.

Fig. 10 is an end elevation of the receiving pan illustrated in Fig. 9.

Fig. 11 is a perspective view of fragmentarily illustrated photo-electric sorting head together with the adjacent portions of the mating pan conveyor there-above and a trip pan conveyor there-below.

Fig. 12 is a perspective view, fragmentarily illustrating the trip pan conveyor and showing two of the trip pans with an article deposited in one of them, represented as seen from the side of the apparatus away from that illustrated in Fig. 11.

Fig. 13, is a side elevation principally schematic fragmentarily illustrating the trip pan conveyor and showing the release mechanism therefor, together with the manner of reclosing the bottom of the trip pan after its function has been performed.

Fig. 14 is a view in perspective of one of the trip pans of Figs. 11, 12 and 13.

Fig. 15 is a fragmentary perspective view of the opposite side of the trip pan of Fig. 14 represented as seen from the same side of the apparatus as in Fig. 11.

Fig. 16 is a perspective view corresponding to Fig. 1 illustrating a modification, or alternative embodiment of the invention, employing intermediate gates between the walking-board conveyor and the horizontal run of the mating pan conveyor for more precisely determining the instant of release of the articles to the mating pan conveyor.

Fig. 17 is a fragmentary detail view in side elevation of the intermediate gate mechanism of Fig. 16.

Fig. 18 is a vertical section of the apparatus of Fig. 17, represented as cut by a plane 18—18.

Fig. 19 is a cross sectional view of a holding pan for use in the mating pan conveyor of Fig. 16 represented as cut by plane 19—19.

Fig. 20 is a plan view of the holding pan of Fig. 19.

Fig. 21 is an end view of the holding pan of Fig. 19 and 20.

Fig. 22 is a side view of holding pan of Figs. 19, 20 and 21.

Fig. 23 is a plan view of a receiving pan used in the horizontal and vertical runs of the mating pan conveyor of Fig. 16.

Fig. 24 is an end view of a receiving pan of Figs. 16 and 23.

Fig. 25 is a side view of the receiving pan of Figs. 16, 23 and 24.

Fig. 26 is an oblique view of the receiving pan of Figs. 16, 23, 24 and 25.

Like reference characters are utilized throughout the drawings to designate like parts.

Referring to the drawings, in the embodiment of the apparatus illustrated in Fig. 1, there is a walking-board conveyor 11 advancing a pluarlity of rows, 12, 13 and 14 of fragile articles such as lemons 15, progressing one at a time. The lemons 15 are deposited in the walking-board conveyor 11 from receptacles in which they are brought from the lemon groves or they may be slid gently into the walking-board conveyor 11 from a chute 16. The walking board conveyor 11 does not itself constitute our present invention, and need therefore not be described in detail.

Briefly, the conveyor 11 comprises sets of boards which are alternately moved up and down in any suitable manner such as by means of linkage described in Patent No. 1,970,107 Steblar or Patent No. 1,760,369 Moe, for example, whereby the lemons 16 progressively roll off the upper edge of one board on to the next and eventually drop off the end 17 of the conveyor 11. In the embodiment illustrated, with three parallel rows, three lemons 15 drop off the end 17 simultaneously.

For receiving the lemons dropping off the end 17 of the walking board conveyor 11, a mating pan conveyor 18 is provided having a horizontal run 19 of receiving pans in receiving relation to the end 17 of the walking-board conveyor 11. The mating pan conveyor 18 also has a vertical run illustrated at 21 in Figs. 1 and 4. At the lower end 22 of the vertical run 21 of the mating pan conveyor 18, there is a photo-electric sorting head 23 illustrated in Figs. 5, 6 and 11. The photo-electric sorting head 23 may be of the type described in Patent Number 2,656,923, granted to David C. Cox, or in the co-pending application of David C. Cox, Serial No. 294,427, filed June 19, 1952, now Patent No. 2,833,937, not constituting our invention and need therefore not be described in detail herein.

Below the photo-electric sorting head 23 is a trip conveyor 24 which may be actuated in the manner described in the aforesaid co-pending application of David C. Cox, Serial No. 294,427, now Patent No. 2,833,937, or Cox application, Serial No. 377,942, filed September 1, 1953, now abandoned, by signals received from the photo-electric sorting head 23, as will be described in greater detail hereafter. However, the trip pan conveyor 24 described in the present application employs trip pans 25 of novel and improved construction.

The mating pan conveyor 18, as illustrated primarily in Fig. 1 and 4, comprises a pair of conveyor chains 26 carrying receiving pans 27 and a pair of conveyor chains 28 carrying holding pans 29. The conveyor chains 26 for the receiving pans 27 are supported in such a manner as to provide the horizontal run 19 and vertical run 21. For example, there may be a pair of sprocket wheels or the like 31 and 32 with the upper points of their pitch circles lying on a horizontal plane so as to carry the receiving pans 27 horizontally along the end 17 of the walking board conveyor 11. There is also a sprocket wheel 33 or the like below the sprocket wheel 32 in such a position that the right hand points of the pitch circles of the sprocket wheels 32 and 33 lie in a vertical plane so that the receiving pans 27 travel downward vertically from the wheel 32 to sprocket wheel 33. If desired, there may be also guide wheels 34 for conducting the chains from the sprocket wheels 33 to sprocket wheels 31.

For supporting the chains 28 for the holding pans 29 of the mating pan conveyor 18, sprocket wheels 35 and 36 are provided, mounted one above another so that the holding pans 29 travel vertically downward in the vertical run 21 of the mating pan conveyor. Moreover, one of the pairs of the sprocket wheels for each of the conveyor chains 26 and 28 is mechanically driven by a power source common to that driving operating linkage 37 for the walking-board conveyor 11. Besides the spacing of the receiving pans 27 on the conveyor chains 26 corresponds to the spacing between the rows 12, 13 and 14 of the walking-board conveyer 11. The synchronization is such that one of the receiving pans 27 is at each of the rows 12, 13 or 14 of the walking-board conveyor 11 when the walking board conveyor is in such a position of its cycle as to cause one of the articles to fall off the end of the row and into the receiving pan 27. Moreover, the speed ratio between the rate of movement of the conveyor chain 26 and the frequency of movement of the boards in the walking board conveyor 11 is such the number of receiving pans 27 traveling past the end 17 of the walking-board conveyor 11 for each cycle of operation of the walking board conveyor 11 is equal to the number of rows. In the particular embodiment illustrated, three of the receiving pans 27 travel past the end 17 of the walking-board conveyor 11 for each cycle of operation of the walking-board 11 causing lemons to drop therefrom.

The mating pans 27 and 29 are formed of sheet material in the embodiment of the invention represented by Figs. 4, 7, 8, 9 and 10. As illustrated, this consists of sheet metal, preferably a light sheet metal such as aluminum or magnesia alloy. As illustrated in Figs. 7 to 10, flat sheets of metal are bent to form polyhedral angles substantially. For example, each receiving pan 27, as shown in greater detail in Figs. 9 and 10, comprises a sheet bent along oblique lines 38 and 39 to form dihedral angles with the planes thereof intersecting at a point 41 constituting the apex of a polyhedral angle. The edges of the sheet metal are also very nearly joined along the line 42 so that relatively blunt dihedral angles are formed at 38 and 42. However, the transverse dimensions of the blunt edges 38 and 42 are relatively small in comparison with the article to be sorted such as lemons so that the lemon is carried in a fixed position toward the apex 41 of the receiving pan 27. The sheet material, if desired, may also be bent along lines 43 to form wing portions 44 helping to guide lemons 15 in dropping from the walking-board conveyor 11 into the receiving pan 27. If desired, inwardly bent nose portions 45 may also be provided which, as will be explained in more detail hereinafter, cooperate with corresponding portions of the holding pans 29 to form blunt apices of the mating pan pairs on the vertical run 21 of the mating pan conveyor 18.

It will be understood that Fig. 10 represents the receiving pan 27 of Fig. 9 as seen from the right hand end of the view of Fig. 9.

For supporting the receiving pan 27 on the conveyor chain 26 a saddle 46 is provided preferably formed of sheet metal or the like riveted or otherwise fastened at points 40 to the pan 27 and having reinforcing strips of durable substance such as cold-rolled steel 47 riveted thereto. The strips 47 are each provided with an opening 48 adapted to receive an elongated link pin of the chain 26 and a second opening 49 adapted to receive another elongated link pin of the chain 26 such as link pins 51 and 52 shown in Fig. 3. One of the openings such as the opening 49 is preferably elongated to allow for any slight variations which may take place in the link lengths of the chain 26.

The holding pans 29 are likewise composed of sheet material bent along lines 53, having a blunt angle 54, and with edges 55 very nearly brought together to form in effect a blunt edge of a dihedral angle. Tips or nose portions 56 are bent inward to correspond with nose portions 45 of the receiving pan 27. A saddle 57 is povided similar to saddle 46 with a reinforcing strip 58 adapted to receiving elongated link pins 59 and 60 as illustrated in Fig. 3. As shown in Figs. 3 and 4, the mating pans 27 and 29 are so formed and have their edges so cut that adjacent edges of the lower portions of the mating pans are in substantially juxtaposed position when they are in the vertical run 21, illustrated in Figs. 3 and 4. Moreover, the inwardly bent tips 45 and 56 of the receiving pan 27 and the holding pan 29 form a relatively broad apex 62 of a polyhedral angle the planes of which are formed by plane surfaces 63 and 64 of the receiving pan 27 and plane surface 65 and 66 of the holding pan 29, against which a lemon or like article rests when it is supported within the pair of mating pans 27 and 29 in the vertical run 21.

The trip pan conveyor 24, as illustrated most particularly in Figs. 12, 13, 14, and 15, and generally in Fig. 11 comprises a pair of conveyor chains 68 supporting the trip pans 25 by means of elongated chain link pins 69 represented in Fig. 12. Each trip pan 25 is provided with a chassis 71 which supports the pan on the conveyor chains 68 by means of the link pins 69. These chassis each comprise a pair of side strips 72 joined at one end by a cross rod 73 extending through the openings 74 (Fig. 14). The ends of the rods 73 protrude outwardly from the sides of the strips so as to rest on the chains 68 when in the position of Fig. 12. This arrangement facilitates in passing the trip pans 25 around the sprocket wheel. Each trip pan 26 is provided with sloping end walls 76 and 77 joined to side walls 78. A releasable bottom 79 is provided, hinged or pivotally mounted on the strips 72 of chassis 71 adjacent one of the end walls 77. By reason of the flexibility of the conveyor chain 68 the trip pans 25 are resiliently mounted. In order to provide additional resilience and protection for articles falling from the photo-electric sorter head 23 against concussion or bruising, resilient liners 81 (Fig. 14) are provided for the end walls 76 and 77 and the releasable bottom 79. The liners 81 may be composed of suitable resilient material such as foam rubber for example. As shown in the drawings particularly Figs. 13 and 14, the end walls 76 and 77 are comparatively steep. The wall 76 is steeper than the wall 77. The wall 77 is less in vertical extent than the wall 76. The releasable bottom 79 is also inclined at a considerable angle to the horizontal.

Preferably the direction of motion, as indicated by the arrow 82, is such that the steep wall 76 is the forward wall of the trip pan 25 and free end 83 of the releasable bottom 79 is the forward end thereof, the pivot axis 84 of the releasable bottom 79 being at the after end thereof. The angle of inclination at the bottom 79 when in the closed position is such that assuming 50% deadening of any impact force of falling objects by the foam rubber cushion 81, the forward component of bounce of an article falling into the trip pan 25 would about equal the speed of the forward movement of the conveyor. In this manner the falling object quietly finds its position of rest at the bottom of the trip pan conveyor 24 between the cushioned surfaces 81 of the releasable bottom 79 and the forward wall 76, the opening there between being smaller than the size of the object to be received.

To facilitate operation of the release mechanism for the releasable bottom 79, the bottom 79 is preferably secured by welding, brazing or the like to a pivot shaft 85, rotatably mounted in the chassis 71 between the side strips 72 and carrying a cam 86 adapted to cooperate with a detent 87 pivotally supported on one of the side strips 72 by means of a pin 88 and having a trip arm 89. A biasing spring 91 is also provided for the detent 87 for holding it against the cam 86 in a notch 92 therein.

Preferably reinforcing blocks 93 are secured to the side strips 72 by welding or otherwise to reinforce the elongated chain link pin receiving slots 75. At that end of the pivot shaft 85 for the pan bottom 79 opposite the detent mechanism 86 and 87, a double-arm lever 94 is provided. The lever 94 has a normally horizontal arm 95 adapted to cooperate with one of the reinforcement blocks 93 to provide an upward stop for the pan bottom 79 when it is closed and a normally vertical arm 96 adapted to cooperate with a tension spring 97 to provide accelerating force for the opening of the bottom 79 when the detent 87 is released.

As described more fully in the aforesaid applications of Cox, Serial Nos. 294,427 and 377,942, a plurality of retractable trip pins are provided in the line of motion of the trip arm 89 so that in the event that any of these trip pins remain unretracted the trip arm 89 will strike such trip pins for releasing the detent 87 and opening the releasable bottom 79. A single fixed trip pin 98 is provided near the end of the horizontal travel of the trip pan conveyor 24, in order to open the pan 25 and discharge any article which may remain thereon before the conveyor chain 68 reaches the supporting sprocket wheel 99. The supporting sprocket wheel 99 is driven by a mechanism synchronized with the drive for the linkage 37 of the walking board conveyor 11 and the mating pan conveyor 18 as previously indicated.

The operation of the embodiment of Figs. 1 to 15 is as follows:

As the lemons 15 progress along the walking board conveyor 11 they ultimately reach the lower end 17 and are deposited, ordinarily three at a time each in a separate one of three adjacent receiving pans 27. The receiving pans move to the right along the horizontal run 19, then to the vertical run 21. In the arrangement as shown the first three pans have moved out of the way, two of them already having begun their vertical descent. The next three receiving pans have come into position to receive the next group of lemons leaving the end 17 of the walking-board conveyor 11, during the cycle of operation of the conveyor 11.

As shown in Fig. 4 as each receiving pan 27 travels over the sprocket wheel 32 it revolves, causing the lemon or other article therein to be rolled forward until it is resting solely between the plane surfaces 63 and 64 and is rolled toward the adjacent holding pan 29. After the portion of the chain 26 supporting the pan 27 has become vertical the nose portion 45 thereof, aligns with the corresponding nose portion 56 of the holding pan 29 as illustrated by the lower pair of the mating pans 27 and 29 in Fig. 4. Through the vertical portion of the movement the article 15 rests above the broad apex 62 of the mating pans 27 and 29, actually being supported by the oblique plane surfaces 63, 64, 65 and 66.

After the mating pans 27 and 29 have reached the bottom 22 of the vertical run 21 represented in Fig. 4 they begin to open as shown in Fig. 5. However, owing to the speed of motion of the mating pans 27 and 29 the lemon 15 has, at this instant, no greater vertical speed imparted thereto by the acceleration of gravity than the opening speed of the rotating portions 45 and 56 of the mating pans 27 and 29. Moreover, no horizontal movement is imparted and the lemon or the article 15 continues to fall in the straight vertical path which it had while in the vertical run of the mating pan conveyor 18.

Thereafter the mating pans 27 and 29 open still further as illustrated in Fig. 6 and the lemon 15 continues in free fall into the photo-electric sorting head 23 which has a vertical opening through which it receives such articles.

Upon falling through the photo-electric sorting head 23, the lemon drops into one of the trip pans 25 which is then directly under the photo-electric sorting head 23 by reason of the synchronization of the drives of the conveyors above mentioned. The same action above described takes place with respect to the lemons or other articles received in the next receiving pans, and the next lemon falling through the photo-electric sorting head is deposited in the next trip pan which is then in position directly thereunder.

The photo-electric sorting head 23 includes amplifier mechanism and a memory or delay device not shown herein, but described in the aforesaid Patent 2,656,923 and co-pending applications, Serial Nos. 294,427, now Patent No. 2,833,937, and 377,942, now abandoned. Consequently if the lemon had such a reflectivity as to call for separation in a certain group, at the instant the trip pan release lever 89 reaches the cooperating trip pin, the trip pin will engage the lever 89 and cause the opening or release of the bottom 79. However, if the reflectivity of the article falling through the photo-electric head had been such as not to call for selection in any of the classifications, the trip pins would have been in retracted positions and tripping of the pan 25 would have been avoided until the end of the horizontal travel when the fixed trip pin 98 is reached.

The trip pan 25 represented in the horizontal position in Fig. 13 has just reached the position 25 to engage the fixed trip pin 98, which causes the trip lever 89 to be rotated around the pivot 88 and to retract the detent 87 from the notch 92. This permits the cam 86 to rotate to the left or counterclockwise as seen in Figs. 13 and 14 to release the pan bottom 79. However, when the pan 25 reaches the position 25a shown at the left in Fig. 13 and begins to be revolved around the axis 101 of the sprocket wheel 99, both the force of gravity and centrifugal force act upon the pan bottom 79 with cumulative strength to drive it into closed position, overcoming the force of the spring 97, rotating the cam 86 and permitting the detent 87 to drop again into notch 92, holding the pan 25 in the closed position until the trip lever 89 again strikes a trip pin.

The bottom 79 opens with great velocity when the trip lever 89 strikes a trip pin such as the pin 98 so that the bottom 79 falls faster than any article supported in the pan 25, and provides no interference with the free fall of such article into conveyors or bins below. Any tendency for the hinged bottom 79 to deflect the article is avoided. Accelerated opening of the bottom 79 when the trip lever 89 is released is accomplished by the fact that the force of gravity is aided by the substantial force of the tension spring 97.

The instant of depositing of the articles in the horizontal run 19 of the mating pan conveyor 18 may be timed still more accurately by interposing intermediate gates 105, as illustrated in Fig. 16, between the end 17 of the walking board conveyor 11 and the horizontal run 19 of the mating pan conveyor. As a result of the increased precision of the timing of the depositing of the articles in the mating pan conveyor, the speed of operation may be increased and a still greater number of rows of articles 15 may be provided in the walking-board conveyor 11. For example, in Fig. 16 the walking boards are made with additional notches so as to provide five parallel rows of moving articles 106, 107, 108, 109, and 110 adapted to drop on the horizontal run 19 of the mating pan conveyor 18.

The mechanism interconnecting the drive for the mating pan conveyor 18 and the walking-board 11 is accordingly such that five of the receiving pans traverse the end 17 of the walking-board conveyor 11 for each cycle of operation thereof.

As shown in the Figs. 17 and 18, the intermediate gate mechanism 105 comprises a pair of parallel shafts 113 and 114 supporting sloping leaves 115, 116 pivoted so that when swung together receptacles are provided having closed ends 117 and 118. A suitable linkage is provided for synchronizing the leaves 115 and 116 and the supporting shafts 113 and 114 with the walking-board conveyor 11. For example, as shown in Fig. 16, crank arms 121, 122, may be mounted on the shafts 113 and 114 with a cross link 123. A cam follower 124 may be secured to one of the cranks 122 adapted to cooperate with a cam 125 carried by shaft 126 connected by means of chain drive 127 or otherwise to a shaft 128 constituting the drive shaft for the walking board conveyor 11.

Since the walking board type of conveyor readily handles lemons and similar articles in each row at speed of approximately 70 per minute, a five-row walking board conveyor 11 shown in Fig. 16, may be used for feeding 350 lemons per minute to the mating pan conveyor 18 and a 10 row walking board conveyor would supply such a system efficiently and accurately with 700 lemons or similar articles per minute.

The cam 125 is shaped with such a cam lift as to open the intermediate gate cups with the leaves 115 and 116 moving back fast enough so that the lemon doesn't follow the leaf. The leaves 115 and 116 remain open long enough to allow the lemons to clear the cups but are completely closed 70% of the time. This closed time allows a large error in the delivery time of the lemon by the walking board conveyor 11 to the intermediate gate. The intermediate gate serves to receive the lemons from the walking-board 11 even with a large time error and yet deliver the lemons to the mating pan conveyor 19 with a very small time error.

Moreover, the design of the intermediate gate reduces to a negligible amount the effect of variances in size of lemons. As shown, the slope of the leaves 115 and 116 at the low point 129 is not over 45° to 50° from the horizontal, and the leaves 115 and 116 are curved with increasing slope toward the supporting pivot shafts 113 and 114. Consequently, the various sizes of lemons rest in very nearly the same position. For example, a three inch lemon will rest only ¼ inch higher than a 1½" lemon.

Although in Figs. 4 to 10 we have illustrated mating pans composed of sheet metal bent to form polyhedral angles, it will be understood that the invention is not limited thereto and that other materials and methods of construction for the mating pans may be employed. For example, as illustrated in Figs. 16 and 19 to 25, inclusive, mating pans may be employed which are molded from plastic material such as polymethyl methacrylate, polyethylene, or co-polymers of various esters.

In Figs. 19 to 22 a suitable modified form of holding pan is illustrated, and in Figs. 23 to 25 a corresponding form of receiving pan is illustrated. Saddles similar to the saddles 46 illustrated in Fig. 4 to 10 inclusive may be, if desired, employed for supporting the mating pans of Figs. 16 and 19 to 25; but the invention is not limited thereto and lateral supporting wings 131 may be provided as illustrated in Fig. 16, which are riveted to the mating pans at one end and to strips 47 at the other end for receiving link pins of the conveyor chains 26 and 28 of Fig. 4.

As shown in Figs. 19 to 25, the shapes of the mating pans have been modified to form relatively broad nose portions with short straight edges 132 so as to provide an apex even broader than the apex 62 of the cooperating pair of mating pans of Fig. 4 when they are in the downward moving vertical run 21. The length of the straight portion 132 is less than the diameter of the smallest lemon to be handled so that the broadness of the apex does not interfere with centering of the lemon in the dropping path and still insures that the lemon will continue to fall in the straight vertical line of descent in which it has been started after it drops through the photoelectric head 23. However, the broadness of the apex with the shallow slope of planes 142, 143, 144, and 145 causes the tip end of the lemon to tilt to one side or the other so as to avoid a lemon dropping into the trip pan 25 on its blossom end. In this matter the inception of mold damage is avoided since the blossom end of the lemon is the portion which is most vulnerable to damage of this kind.

Referring to Fig. 23, it will be observed that each molded receiving pan 133 has a bottom portion 134, curved as shown clearly at 135 in Fig. 24, and sloping toward an apex 136 of a polyhedral angle so as to start the lemon moving into the central path as soon as it falls into receiving pan 133 from the walking board conveyor 11. The nose 137, as already pointed out, has a short straight edge 132 flaring slightly from the polyhedral angle apex 136 along a triangular surface 138 so as to cause the lemon to roll around its longitudinal axis and on its smaller circumference as the receiving pan 133 gradually tilts upon reaching the sprocket wheel 32 of Fig. 4.

As shown most clearly in Fig. 20, each plastic holding pan 139 has a shape conforming to the corresponding portion of the receiving pan 133. When two mating pans are brought into juxtaposition, the lemon rests between the six triangular surfaces 138, 141, 142, 143, 144 and 145, and the mating pans assume the position illustrated in Fig. 3, with the lemon having its tips sideways.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention.

What we claim and desire to secure by Letters Patent of the United States is:

1. Sorting apparatus comprising in combination a walking-board conveyor having a plurality of lanes, a mating pan conveyor, a sorting head and a trip pan conveyor, the mating pan conveyor comprising receiving pan conveyor means carrying a plurality of receiving pans and holding pan conveyor means carrying a plurality of holding pans, the receiving pan conveyor means having a horizontal run and a vertical run with the horizontal run carrying the receiving pans in receiving relation to said walking board conveyor and synchronized therewith to present a plurality of receiving pans to said walking board conveyor whenever articles are ejected therefrom, the sorting head being below the vertical run, the holding pan conveyor means carrying the holding pans in juxtaposed relation to the receiving pans carried by the receiving pan conveyor means through its vertical run for carrying the articles downward from the horizontal run of the receiving pan conveyor means and releasing the articles at the lower end of the vertical run into the sorting head, the trip pan conveyor having a horizontal run below said sorting head for receiving articles falling through said sorting head, the spacing of the receiving pans on the receiving pan conveyor means equaling the spacing between lanes of said walking-board conveyor, the speed of the receiving pan conveyor means in relation to the operating rate of the walking-board conveyor being such that a number of receiving pans, equaling the number of lanes of the walking-board conveyor, passes said walking-board conveyor for each ejection operation of the walking-board conveyor, said pans being formed of sheet material substantially in the form of polyhedral angles with each article resting in the apex of the polyhedral angle of a receiving pan while it is in the horizontal run, and the juxtaposed pairs of mating pans each forming a polyhedral angle with a downward apex, in which the article is adapted to be supported when the pans are in the vertical run.

2. In sorting apparatus for handling relatively fragile articles such as fruit having a sorting head through which the articles to be sorted are dropped and in which the selection is to be made when the articles are freely falling, the combination comprising a walking-board conveyor having a plurality of lanes, a mating pan conveyor comprising receiving pan conveyor means carrying a plurality of receiving pans and holding pan conveyor means carrying a plurality of holding pans, said receiving pan conveyor means being arranged to travel in a horizontal run followed by a vertical run and said holding pan conveyor means being arranged to travel downward in a vertical run for causing each holding pan to travel in juxtaposition to one of the said receiving pans in the vertical run of the receiving pan conveyor means, and causing release of articles at the lower end of the vertical run, the horizontal run of the receiving pan conveyor means being positioned for carrying receiving pans horizontally in receiving relation to said walking-board conveyor and synchronized therewith whenever articles are ejected therefrom, a sorting head below the lower ends of the vertical runs of such conveyor means and means for receiving articles which have fallen through the sorting head, said vertical run being above said sorting head for enabling articles which are to be sorted to come to rest in their positions in the mating pan conveyor for falling in a truly vertical course when reaching the sorting head, affected only by the acceleration of gravity and unaffected by horizontal motion of any conveyor parts, the spacing of the receiving pans equaling the spacing between lanes of said walking-board conveyor, the speed of the receiving pan conveyor means being such that a number of receiving pans equaling the number of lanes of the walking-board conveyor passes said walking-board conveyor for each ejection operation of said walking-board conveyor, said pans being formed of sheet material substantially in the form of polyhedral angles with each article resting in the apex of the polyhedral angle of a receiving pan while it is in the horizontal run, and each pair of juxtaposed mating pans forming a polyhedral angle with a downward apex in which the article being sorted is adapted to rest when the pans are in their vertical run.

3. A mating pan conveyor for receiving articles to be sorted and delivering them to a sorting head in sorting apparatus of the type responsive to the articles to be sorted while they are falling freely through the sorting head, said conveyor comprising singulating means for arranging articles in longitudinal and lateral rows and moving them down said longitudinal rows, a conveying means synchronized with said singulating means, said conveying means including a receiving pan conveyor chain carrying a plurality of receiving pans located at the depositing end of said singulating means and spaced one from the other to correspond with the spacing of said longitudinal rows, and a chain carrying a plurality of holding pans, said receiving pan chain having supporting sprockets arranged in such positions as to provide an horizontal run in which articles to be sorted are deposited from said singulating means in the receiving pans and a vertical run in which articles are to be held preparatory to release to a sorting head, said holding pan chain having supporting sprockets in vertical alignment to provide a vertical run parallel to the vertical run of the receiving pans, adjacent thereto, whereby pairs of mating pans each consisting of one receiving pan and one holding pan move downward together in the vertical run of said chains in juxtaposed relation and separate at the lowest point of the vertical run to release the articles, said pans being formed of sheet material substantially in the form of polyhedral angles with each article resting in the apex of the polyhedral angle of the receiving pan while it is in the horizontal run and each pair of juxtaposed mating pans forming a polyhedral angle with a downward apex in which the articles come to rest when the mating pans are in their vertical run.

4. Apparatus as in claim 3 wherein the lower sprockets are mounted above the sorting head and means are provided for driving the chain sprockets whereby the mating pans revolve around said lower sprockets and cause rapid separation of the mating pans in each pair of mating pans and straight line drop of the article therein.

5. A mating pan conveyor for receiving articles to be sorted and delivering them to a sorting head in sorting apparatus responsive to the type of articles to be sorted while they are falling through the sorting head, said conveyor comprising singulating means for arranging articles in longitudinal and lateral rows and moving said lateral rows down said longitudinal rows, a plurality of receiving pans and a plurality of holding pans, means for carrying said receiving pans horizontally in synchronism with the movement of said lateral rows and thereafter vertically downward, the receiving pans being open at the top while traveling horizontally for enabling articles to be sorted to be deposited therein and the receiving pans being tilted while traveling downward, means for carrying the holding pans vertically downward, each holding pan in juxtaposition with one of the receiving pans, said pan-carrying means being arranged to separate the pans at the lowermost point of travel, whereby pairs of mating pans each consisting of one receiving pan and one holding pan move downward together and release articles held therein upon separating.

6. A mating pan conveyor for receiving articles to be sorted and delivering them to a sorting head in sorting apparatus of the type responsive to articles to be sorted while they are falling freely through the sorting head, said conveyor comprising singulating means for arranging articles in longitudinal and lateral rows and moving them down said longitudinal rows, a conveying means synchronized with said singulating means, said conveying means including a receiving pan conveyor chain carrying a plurality of receiving pans located at the depositing end of said singulating means and spaced one from the other to correspond with the spacing of said longitudinal rows, a chain carrying a plurality of holding pans, said receiving pan chain having supporting sprockets arranged in such positions as to provide an horizontal run in which articles to be sorted are deposited from said singulating means in the receiving pans and a vertical run in which articles are to be held preparatory to release to a sorting head, said holding-pan chain having supporting sprockets in vertical alignment to provide a vertical run parallel to the vertical run of the receiving pans, adjacent thereto, whereby pairs of mating pans each consisting of one receiving pan and one holding pan move downward together in vertical run of said chains in juxtaposed relation and separate at the lowest portion of the vertical run to release the articles by gravity, said pans having tapered nose portions formed to cooperate when the mating pans are in juxtaposition in the vertical run to provide a substantially polyhedral conformation with a downward apex toward which the articles come to rest as the mating pans start downward.

7. In combination, a walking-board conveyor having a discharge end, a mating pan conveyor having a horizontal run with receiving pans aligned with the walking-board conveyor, each for receiving one at a time articles discharged from the walking-board conveyor, and intermediate gate means interposed between the discharge end of the walking-board conveyor and the mating pan conveyor for precisely timing the instant of deposite of each article in a receiving pan of the mating pan conveyor.

8. A mating pan conveyor for receiving articles to be sorted and delivering them to a sorting head, said conveyor comprising singulating means for arranging articles in longitudinal and lateral rows and moving them down said longitudinal rows, a conveying means synchronized with said singulating means, said conveying means including a receiving pan conveyor arranged at the end of the longitudinal rows and carrying a plurality of receiving pans spaced to correspond with the spacing of said longitudinal rows, a holding pan conveyor carrying a plurality of holding pans, said receiving pan conveyor having supporting means providing an horizontal run in which the conveyor is adapted to have articles deposited in the receiving pans and a vertical run, the receiving pan being relatively deep and the holding pan being shorter than the receiving pan, said holding pan conveyor having supporting means providing a vertical run parallel to the vertical run of the receiving pan conveyor and adjacent thereto, whereby pairs of mating pans, each consisting of one receiving and one holding pan, move downward together vertically in juxtaposed relation, the holding pan substantially closing the forward end of the receiving pan.

9. A conveyor for receiving articles to be sorted and delivering them to a sorting head, said conveyor comprising singulating means for arranging articles in longitudinal and lateral rows and moving said lateral rows down said longitudinal rows, a plurality of receiving pans located at the ends of said longitudinal rows and spaced a distance one from the other to correspond with the spacing of said longitudinal rows, means for moving said pans horizontally in synchronism with the movement of said lateral rows for having an article deposited in each pan, the pans being open at the top when moving horizontally, means for thereafter moving the pans downward vertically towards a sorting head and thereafter returning pans to their horizontal path, and means for substantially closing the top opening of each pan at the forward end thereof and holding within each pan during the vertical travel thereof, an article deposited therein during the horizontal travel thereof.

10. Apparatus as in claim 9 wherein the receiving pans and the vertical holding means have symmetrical conformation for supporting the article in the vertical motion of the receiving pan and such symetrical conformation is horizontally retracted in opposite directions at the same speed at the lower end of the vertical path of the receiving pans for releasing each article to the sorting head without any horizontal component of motion.

11. In combination, a singulating means for arranging articles in longitudinal and lateral rows and moving the lateral rows down the longitudinal rows for discharge from the ends thereof, a pan conveyor having a horizontal run with receiving pans aligned with the discharge end of said singulating means, said receiving pans moving in synchronism and time sequence with the movement of said lateral rows of articles whereby each receiving pan located at said discharge end receives one at a time articles discharged from the singulating means, and intermediate gate means interposed between the discharge end of the singulating means and the pan conveyor for precisely timing the instant of deposite of each article in the receiving pan of the pan conveyor.

12. In combination, a walking-board conveyor having a plurality of lanes thereby adapting it to arrange articles in longitudinal rows along said lanes and lateral rows between the boards; said walking-board having a discharge end from which lateral rows of articles are dropped row by row in timed sequence, a pan conveyor having a horizontal run with receiving pans spaced one from the other to correspond with the spacing of said lanes, said pans being located at the discharge end of said walking-board conveyor and being moved at a speed synchronized with the walking-board conveyor such that a number of receiving pans equaling the number of lanes passes said walking board for each lateral row of articles dropped therefrom whereby each pan receives one at a time articles discharged from the walking-board conveyor.

13. A mating pan conveyor combination comprising receiving pans and holding pans; means for conveying said pans on a common vertical plane and said receiving pans on the horizontal during a portion of their travel; each of said pans being constructed of several side walls providing an opening in the top substantially larger than the article to be received and conveyed; said side walls forming a polyhedral angle; the apex of the receiving pan's polyhedral angle being downward, when the receiving pan is traveling in a horizontal direction, for receiving an article therein; said pans each having noses leading from said polyhedral angles toward one another and substantially engaging one another when traveling in a vertical direction; said noses being shaped to form when engaged a dihedral angle therebetween and a cavity substantially greater than the article received therebetween whereby an article received in said polyhedral angle of said receiving pan is centralized by rolling into the dihedral angle formed between said noses thereby establishing a predetermined centralized position of said article before being released by the parting of said pans.

14. Sorting apparatus comprising in combination a walking-board conveyor having a plurality of lanes, a mating pan conveyor, a sorting head and a trip pan conveyor, the mating pan conveyor comprising receiving pan conveyor means carrying a plurality of receiving pans and holding pan conveyor means carrying a plurality of holding pans, the receiving pan conveyor means having a horizontal run and a vertical run with the horizontal run carrying the receiving pans in receiving relation to said walking-board conveyor and synchronized therewith to present a plurality of receiving pans to said walking-board conveyor whenever articles are ejected therefrom, the sorting head being below the vertical run, the holding pan conveyor means carrying the holding pans in juxtaposed relation to the receiving pans carried by the receiving pan conveyor means through its vertical run for carrying the articles downward from the horizontal run for the receiving pan conveyor means and releasing the articles at the lower end of the vertical run into the sorting head, the trip pan conveyor having a horizontal run below said sorting head for receiving articles falling through said sorting head, the spacing of the receiving pans on the receiving pan conveyor means equaling the spacing between lanes of said walking-board conveyor, the speed of the receiving pan conveyor means in relation to the operating rate of the walking-board conveyor being such that a number of receiving pans, equaling the number of lanes of the walking-board conveyor, passes said walking-board conveyor for each ejection operation of the walking-board conveyor.

References Cited in the file of this patent

UNITED STATES PATENTS

| | | |
|---|---|---|
| 492,879 | Stoner | Mar. 7, 1893 |
| 706,294 | Beck | Aug. 5, 1902 |
| 788,590 | Nikel | May 2, 1905 |
| 1,706,632 | Onstad | Mar. 26, 1929 |
| 2,096,572 | Brunkow | Oct. 19, 1937 |
| 2,186,196 | Haugh | Jan. 9, 1940 |
| 2,194,381 | Cadman | Mar. 19, 1940 |
| 2,224,282 | Weinschenk | Dec. 10, 1940 |
| 2,656,923 | Cox | Oct. 27, 1953 |
| 2,675,917 | Powers | Apr. 20, 1954 |
| 2,696,297 | Matthews | Dec. 7, 1954 |